March 21, 1944.　　　　E. E. SIMMONS, JR　　　　2,344,647
METHOD AND APPARATUS FOR MAKING STRAIN GAUGES
Original Filed Feb. 23, 1940　　　2 Sheets—Sheet 1
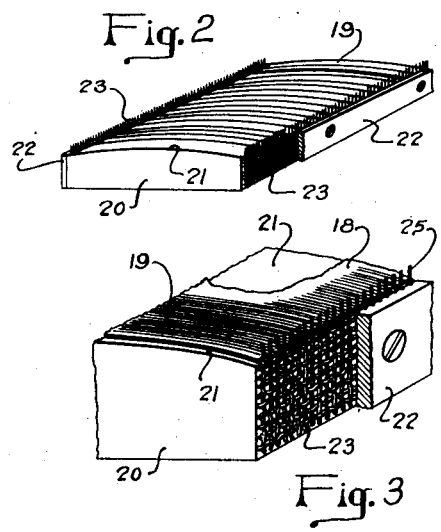
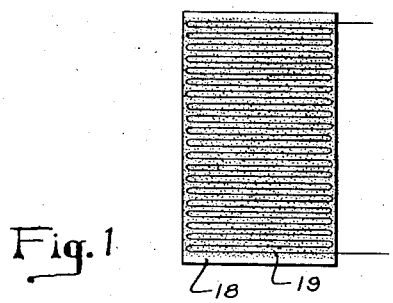
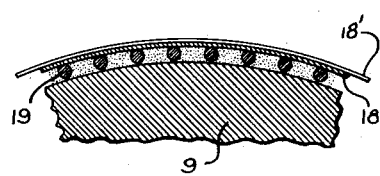
INVENTOR
Edward E. Simmons, Jr.
BY
ATTORNEY March 21, 1944.　　　E. E. SIMMONS, JR　　　2,344,647
METHOD AND APPARATUS FOR MAKING STRAIN GAUGES
Original Filed Feb. 23, 1940　　2 Sheets-Sheet 2

INVENTOR
Edward E. Simmons Jr.
BY
ATTORNEY

Patented Mar. 21, 1944

2,344,647

UNITED STATES PATENT OFFICE 2,344,647

METHOD AND APPARATUS FOR MAKING STRAIN GAUGES

Edward E. Simmons, Jr., Pasadena, Calif.

Original application February 23, 1940, Serial No. 320,327, now Patent No. 2,292,549, dated August 11, 1942. Divided and this application January 1, 1942, Serial No. 425,359

3 Claims. (Cl. 201—63)

This invention relates generally to strain gauges used in the field of stress analysis of specimens and structures, the gauge being of the type employing a bonded metallic wire filament whose electrical resistance varies with its strain and the invention relates more particularly to a method and apparatus for making the gauges. This application is a division of my copending application Serial No. 320,327, filed February 23, 1940 (now Patent No. 2,292,549, dated August 11, 1942).

The type of strain gauge made in accordance with my disclosure herein employs the principle that the electrical resistance of materials varies with the strain thereof, herein referred to as "electrical strain sensitivity." The material of my gauge is an extremely fine wire filament preferably of approximately 0.001 to 0.003 of an inch in diameter and of such length as to have a desired amount of electrical resistance. The filament is bonded throughout its effective length to the surface of a member to be strained so that as the member is strained the filament is similarly strained and its electrical resistance is varied accordingly. The change of resistance may be measured by any suitable measuring circuit such for example as a Wheatstone bridge.

It is an object of my invention to provide an improved method and apparatus for making strain gauges of the type disclosed herein so that they have a high degree of dependability in their sensitivity, accuracy and application to a test surface without impairing such accuracy or sensitivity.

Another object is to provide an improved method and apparatus whereby strain gauges may be made in quantity production while maintaining the desired uniformity in sensitivity and accuracy.

A further object is to provide an improved method and apparatus for forming the extremely fine filament into a desired shape with ease and dispatch and to do it in such a manner that a membrane, such as a piece of thin paper, may be effectively cemented to the filament throughout its effective length while insuring an accurate and sensitive gauge.

Other objects and advantages will be more apparent to those skilled in the art from the following description of the accompanying drawings in which:

Fig. 1 is a preferred form of gauge made in accordance with my improved method and apparatus but shown prior to being affixed to a test member;

Fig. 2 is a perspective view of one form of jig upon which the strain sensitive filament may be initially formed;

Fig. 3 is an enlarged fragmentary perspective view of one corner of the jig of Fig. 2;

Fig. 4 is a greatly enlarged transverse section through a fragmentary portion of a round test member or specimen;

Figure 5:
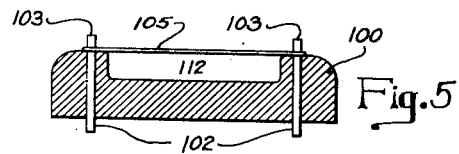
Fig. 5 is a transverse section taken through a modified form of winding jig.

One form of gauge made in accordance with my improved method consists of a filament 19 wound back and forth as shown in Fig. 1 and suitably bonded throughout its effective length to a membrane 18, preferably thin paper. The bonding material may be "Glyptal" or other suitable adhesive insulating material. In use the gauge is entirely bonded to the surface of a test member or specimen 9 by cement such as "Glyptal" and if it is necessary to hold the gauge during drying of the cement, the gauge and specimen 9 may be wrapped together by a string 18'. The paper member 18 is shown on the outside of the filament in which case the bonding cement is the electrical insulator although if desired the paper 18 may be cemented directly to the specimen surface. The filament consists of a very fine metallic wire that is continuously solid throughout its length and whose electrical strain characteristics are predetermined. This wire may be of suitable and well-known material such as "Constantan," "Advance" and various other well-known materials having good resistance properties as well as being capable of fabrication in small wire sizes. The composition of the abovementioned or other suitable materials is well known and may be obtained from usual handbooks on this subject.

One modification of my improved method and apparatus for forming the gauge of Fig. 1 comprises jig 20, Fig. 2, having a convex surface 21 and a pair of removable strips 22 for clamping pieces of wire mesh 23 along each side of the jig. The vertical strands of the wire mesh project slightly above the convex surface thereby providing a series of very closely spaced winding posts or comb teeth. The piece of thin paper 18 is now laid on the convex surface and a single strand of the strain sensitive filament is wound back and forth across the paper covered convex surface and around the upstanding teeth. The convex surface greatly facilitates obtaining uniform slight tautness of the filament and of allowing strands of the filament to be placed very close together but without touching each other. After the filament is wound to the desired extent it is covered with "Glyptal" while remaining on the jig. The jig with the winding and paper thereon is now thoroughly dried and hardened. Thereafter the series of vertical teeth 25 can be broken by bending back and forth with the clamping plates 22 remaining in position. When all of the posts 25 are broken the filament and paper 18 can be removed as a unit from the jig.

Figure 9:
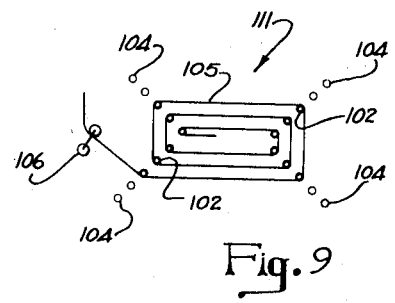
Figs. 9 and 10 are modified forms of gauges adapted to be formed in accordance with my improved method.
Figure 7:
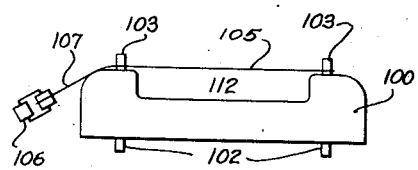
Fig. 7 is an end view of Fig. 6.
Figure 10:
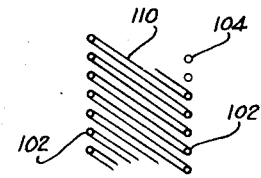

In a preferred form of winding jig as shown in Figs. 5-8, movable winding pins are employed. This arrangement is applicable to machine as well as hand winding and makes the winding of filament mats or gauges less tedious. A long block 100 is drilled and fitted with a series of movable pins 102 which may protrude above the upper surface of the block as at 103. The pins are initially below the upper surface of the block as at 104 but are raised successively as the winding progresses as at 105. In this way the winding is not impeded as is the case with fixed pins. The sequence of winding is as follows: A suitable wire guide 106 pulls a single strand of wire around pin b, across the block and against pin a and downward as at 107. Pin c is raised and the wire is carried around the same across the block and against pin b. Pin d is raised and the wire carried back and forth across the block as successive pins are raised as above described. When the block is completely wound, the wires are coated with cement and covered with a cement-coated paper which is forced into contact with the wires by a convex cylindrical surface as shown at 109. The cement is hardened by baking while in the jig. A space 112 permits a free circulation of air; thus permitting escape of the volatile constituents of the cement. The pins are then withdrawn towards the bottom of the jig and the cemented mat thus freed. Angularly wound mats can be formed as indicated at 110, Fig. 10. Spiral mats may be made on a similar movable pin apparatus as indicated at 111, Fig. 9, where the pins are raised as the winding progresses. Cementing is not as convenient here as the paper must be under the wires and thus pierced by each pin.

Figure 8:
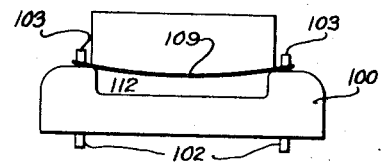
Fig. 8 is an end view of my modified form of jig showing the means for cementing the filament to a paper membrane.
Figure 6:
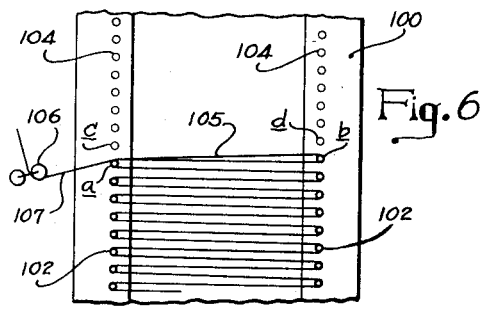
Fig. 6 is a plan view of Fig. 5.

From the foregoing disclosure it is seen that my improved method broadly consists in winding a filament in a desired form and then while it remains supported in its original wound position the filament is bonded to a membrane which performs the dual functions of constituting a supporting medium and electrical insulation. When the membrane is used for insulation the membrane is located between the filament and specimen. More specifically, the step of supporting the filament in its original wound position consists of engaging only the return bends of the filament so that the intermediate portions of the filament are preferably suspended in midair whereby the filament strands are adapted to be slightly tightened or pulled straight when the membrane and filament strands are pressed together with a bonding cement to hold them. This not only insures a highly uniform arrangement of the gauge filament as shown in Fig. 1, but in the form of jig shown in Fig. 5 the cement is freely exposed to the atmosphere thereby insuring rapid hardening of the cement if of the air drying type, but if of the type such as "Glyptal" artificial heat may also be conveniently applied directly to the cement. In both forms of winding jigs I preferably employ the step of imposing a slight curvature to the gauge filament either when the filament is initially wound as in Fig. 2, or after it is wound as shown in Fig. 8, the result in either case being to insure filament strands that are relatively straight although it will of course be understood that the filaments may be untaut so as to have a small amount of waviness. In addition to being able to wind a gauge in a simple, direct and expeditious manner, I am able to form gauges in quantities having a high degree of uniformity in their electrical characteristics.

It will of course be understood that various changes in details of construction and arrangement of parts may be made by those skilled in the art without departing from the spirit of the invention as set forth in the appended claims.

I claim:

1. The method of forming a strain gauge of the type having a continuous solid filament of electrical conducting material whose electrical resistance varies with its strain consisting in winding a strand of the filament back and forth between a series of posts successively alternately positioned on opposite sides of a given line and then cementing the wound filament throughout its effective length to a membrane while said membrane and filament are pressed in a curved condition sufficient to insure that the filament between successive winding posts lies substantially in a single plane normal to the membrane, and thereafter removing the filament and membrane as a unit after the cement has sufficiently dried to hold the filament in position on the membrane.

2. A winding jig for making strain gauges of the type having a continuous solid filament of electrical conducting material whose electrical resistance varies with its strain comprising a block having a series of holes arranged in accordance with the direction in which a gauge filament is to be wound and movable pins in said openings adapted to be first moved to an inoperative winding position and then successively moved to a winding position as a gauge filament is wound around the successive pins, said block having a recess between certain groupings of said pins whereby a filament wound across said recess may be slightly depressed therein when a membrane is cemented to the filament.

3. A winding jig for making strain gauges of the type having a continuous solid filament of electrical conducting material whose electrical resistance varies with its strain comprising a block having a series of holes arranged in accordance with the direction in which a gauge filament is to be wound and movable pins in said openings adapted to be first moved to an inoperative winding position and then successively moved to a winding position as a gauge filament is wound around the successive pins, said block having a recess between certain groupings of said winding pins whereby the wound filament bridges across said recess, and a member having a convex surface adapted to commonly depress all portions of the filament extending across said recess.

EDWARD E. SIMMONS, Jr.